(12) United States Patent
Silkey et al.

(10) Patent No.: US 9,975,625 B2
(45) Date of Patent: May 22, 2018

(54) LAMINATED PLASMA ACTUATOR

(75) Inventors: Joseph Steven Silkey, Florissant, MO (US); David James Suiter, Chesterfield, MO (US); Bradley Alan Osborne, Manchester, MO (US)

(73) Assignee: THE BOEING COMPANY, Chicago, IL (US)

( * ) Notice: Subject to any disclaimer, the term of this patent is extended or adjusted under 35 U.S.C. 154(b) by 1737 days.

(21) Appl. No.: 12/762,562

(22) Filed: Apr. 19, 2010

(65) Prior Publication Data
US 2011/0253842 A1  Oct. 20, 2011

(51) Int. Cl.
| B64C 21/00 | (2006.01) |
| B64C 23/00 | (2006.01) |
| F15D 1/00 | (2006.01) |
| H05H 1/24 | (2006.01) |

(52) U.S. Cl.
CPC .......... B64C 23/005 (2013.01); F15D 1/0075 (2013.01); H05H 1/2406 (2013.01); B64C 2230/12 (2013.01); Y02T 50/166 (2013.01); Y10T 29/49002 (2015.01)

(58) Field of Classification Search
CPC .............. B64C 23/005; B64C 2230/12; H05H 1/2406; F15D 1/0075; Y10T 29/49002; Y02T 50/166
USPC ................................................ 244/205, 207
See application file for complete search history.

(56) References Cited

U.S. PATENT DOCUMENTS

| 3,510,094 | A | * | 5/1970 | Clark ........................... 244/130 |
| 5,310,625 | A | * | 5/1994 | Angelopoulos et al. ..... 430/325 |
| 5,362,534 | A | | 11/1994 | McKenney et al. |
| 6,451,073 | B1 | * | 9/2002 | Farahmandi et al. ....... 29/25.03 |
| 6,570,333 | B1 | * | 5/2003 | Miller et al. .............. 315/111.21 |
| 6,585,152 | B2 | * | 7/2003 | Farahmandi et al. ........ 228/262 |
| 6,930,497 | B2 | * | 8/2005 | Deng et al. .............. 324/755.04 |
| 7,017,863 | B2 | * | 3/2006 | Scott et al. .................... 244/205 |
| 7,090,706 | B2 | * | 8/2006 | Farahmandi et al. ....... 29/25.03 |
| 7,380,756 | B1 | | 6/2008 | Enloe et al. |

(Continued)

FOREIGN PATENT DOCUMENTS

| EP | 1995171 A2 | 11/2008 |
| EP | 2322272 A1 | 5/2011 |

(Continued)

OTHER PUBLICATIONS

He et al., "Numerical and Experimental Analysis of Plasma Flow Control Over a Hump Model", 45th Aerospace Sciences Meeting, Jan. 2007, Reno, Nevada, American Institute of Aeronautics and Astronautics paper 2007-0935, pp. 1-16.

(Continued)

Primary Examiner — Assres H Woldemaryam
(74) Attorney, Agent, or Firm — Yee & Associates, P.C.

(57) ABSTRACT

A method and apparatus may comprise a first number of layers of a flexible material, a second number of layers of a dielectric material, a first electrode attached to a surface layer in the first number of layers, and a second electrode attached to a second layer in one of the first number of layers and the second number of layers. The first number of layers may be interspersed with the second number of layers. The first electrode may be configured to be exposed to air. The first electrode and the second electrode may be configured to form a plasma in response to a voltage.

7 Claims, 9 Drawing Sheets

(56) References Cited

U.S. PATENT DOCUMENTS

| | | | |
|---|---|---|---|
| 7,624,941 | B1 | 12/2009 | Patel et al. |
| 7,637,455 | B2 | 12/2009 | Silkey et al. |
| 7,703,479 | B2* | 4/2010 | Jacob .......................... 137/828 |
| 7,735,910 | B2* | 6/2010 | Ramsay ....................... 296/217 |
| 7,878,460 | B2* | 2/2011 | Armstrong et al. .......... 244/214 |
| 8,172,547 | B2* | 5/2012 | Dyer et al. ..................... 417/76 |
| 8,251,318 | B2* | 8/2012 | Khozikov et al. ........... 244/205 |
| 8,523,115 | B2* | 9/2013 | Essenhigh et al. ........... 244/205 |
| 8,640,995 | B2* | 2/2014 | Corke et al. ................. 244/205 |
| 8,708,651 | B2* | 4/2014 | Greenblatt ..................... 416/24 |
| 8,727,286 | B2* | 5/2014 | Silkey et al. ................. 244/205 |
| 2004/0196620 | A1* | 10/2004 | Knudsen et al. ............. 361/311 |
| 2005/0127780 | A1* | 6/2005 | Ifuku et al. .................. 310/311 |
| 2005/0152096 | A1* | 7/2005 | Farahmandi et al. ........ 361/517 |
| 2008/0023589 | A1* | 1/2008 | Miles et al. .................. 244/205 |
| 2008/0067283 | A1* | 3/2008 | Thomas ....................... 244/1 N |
| 2008/0122252 | A1* | 5/2008 | Corke et al. ............... 296/180.2 |
| 2008/0290218 | A1 | 11/2008 | Schwimley et al. |
| 2009/0065177 | A1* | 3/2009 | Ouyang ....................... 165/80.4 |
| 2009/0173837 | A1* | 7/2009 | Silkey et al. ................. 244/205 |
| 2009/0196765 | A1 | 8/2009 | Dyer et al. |
| 2009/0212164 | A1* | 8/2009 | Osborne et al. .............. 244/205 |
| 2009/0236311 | A1* | 9/2009 | Gessner et al. ................. 216/49 |
| 2010/0004799 | A1 | 1/2010 | Drouin, Jr. et al. |
| 2010/0133386 | A1* | 6/2010 | Schwimley et al. .......... 244/205 |
| 2010/0183424 | A1* | 7/2010 | Roy ................................ 415/1 |
| 2010/0239466 | A1 | 9/2010 | Rousseau et al. |
| 2011/0120980 | A1* | 5/2011 | Corke et al. ............. 219/121.59 |

FOREIGN PATENT DOCUMENTS

| | | |
|---|---|---|
| GB | 2424379 A | 9/2006 |
| JP | H0349291 A | 3/1991 |
| JP | H09501800 A | 2/1997 |
| JP | 2003327416 A | 11/2003 |
| JP | 2010080431 A | 4/2010 |
| WO | WO03013620 A1 | 2/2003 |
| WO | 2007133239 A2 | 11/2007 |
| WO | 2009005895 A2 | 1/2009 |
| WO | WO2009007588 A1 | 1/2009 |
| WO | WO2009098662 A1 | 8/2009 |
| WO | WO2010007789 A1 | 1/2010 |
| WO | 2010014924 A1 | 2/2010 |

OTHER PUBLICATIONS

U.S. Appl. No. 11/753,876, filed May 25, 2007, Schwimley et al.
PCT Notification of Transmittal of the International Search Report and the Written Opinion of the International Searching Authority, International Application No. PCT/US2011/028124, dated Mar. 11, 2011.
Notice of Reasons for Rejection and English Translation, dated Apr. 21, 2015, regarding Japanese Patent Application No. 2013-506150, 4 pages.
Notice of Opposition regarding European Patent Application No. EP11712369.5, dated Dec. 8, 2016, 27 pages.
"DuPont™ Kapton®FN Polyimide Film," Technical Data Sheet, copyright 2006, DuPont, 3 pages. http://www.dupont.com/content/dam/dupont/products-and-services/membranes-and-films/polyimde-films/documents/DEC-Kapton-HN-datasheet.pdf.
Bernard et al., "A large-scale multiple dielectric barrier discharge actuator based on an innovative three-electrode Design," Journal of Physics D: Applied Physics, vol. 42, No. 23, Nov. 2009, 12 pages.
Boucinha et al., "Characterization of the ionic wind produced by a DBD actuator designed to control the laminar-to-turbulent transition," 14th International Symposium on applications of Laser Techniques to Fluid Mechanics, Paper No. 1352, Jul. 2008, 13 pages.
Boucinha et al., "Contrôle d'écoulements par action d'un plasma froid de type DBD: application a la transition et au décollement," Journées GDR <<Contrôle des Décollements>>, CNAM Paris, Oct. 2007, 26 pages. (English translation not available).
Programme, Journées GDR <<Contrôle des Décollements>>, CNAM Paris, Oct. 2007, 2 pages. (English translation not available).
Little et al., "High-lift airfoil trailing edge separation control using a single dielectric barrier discharge plasma actuator," Experiments in Fluids, vol. 48, No. 3, Mar. 2010, pp. 521-537.
Pavón, "Interaction Between a Surface Dielectric Barrier Discharge and Transonic Airflows," Thèse No. 4201, École Polytechnique Fédérale de Lausanne, Oct. 2008, 178 pages.
Pavón, "Interaction Between a Surface Dielectric Barrier Discharge and Transonic Airflows," Thesis Abstract, 2008, 3 pages. https://infoscience.epfl.ch/record/125997.

* cited by examiner

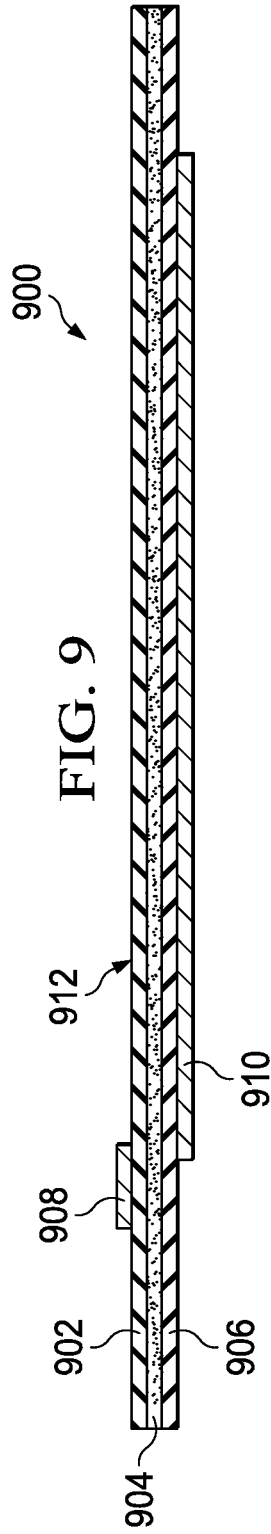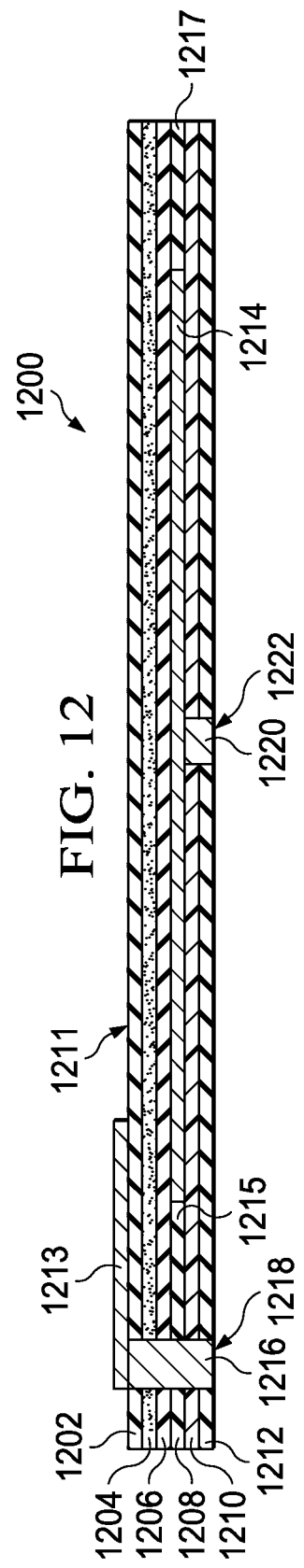

LAMINATED PLASMA ACTUATOR

BACKGROUND INFORMATION

1. Field

The present disclosure relates generally to aircraft and, in particular, to controlling the flight of an aircraft. Still more particularly, the present disclosure relates to a method and apparatus for controlling the flow of air using a plasma actuator.

2. Background

During flight, a pilot may use controls to adjust and control the movement of the aircraft. These controls may be used to manipulate the airflow over various parts of an aircraft. Control surfaces may control the flow of air over a surface of the aircraft where air flows. With control surfaces, the movement of an aircraft about different axes may be controlled. For example, the control surfaces may be used to control at least one of pitch, roll, and yaw for an aircraft.

Control surfaces may include, for example, without limitation, ailerons, elevators, rudders, horizontal stabilizers, vertical stabilizers, spoilers, flaps, slats, airbrakes, and other types of control surfaces. These types of mechanisms, however, may require maintenance and may not provide the amount of airflow control for a desired amount of performance. Further, these control surfaces may require movement of structures. The movement of these structures may include the use of actuators, hinges, and other structures to move a control surface.

One alternative to the currently used control surfaces may be a plasma actuator. A plasma actuator may control the flow of air over a surface through the formation of a plasma. This plasma also may be referred to as a dielectric barrier discharge. With a plasma actuator, a plasma may be formed between a pair of electrodes when an alternating current or nanosecond pulse voltage is applied across electrodes. Air molecules may be ionized in the vicinity of the electrodes and accelerated through an electric field. The plasma discharge may induce airflow, shock, and/or acoustic disturbances to change the flow of air over a surface.

Plasma actuators may provide for increased airfoil lift, separation delay, boundary layer transition, drag reduction, and other desirable features. Additionally, the use of plasma actuators may reduce and/or eliminate the need for control surfaces, such as ailerons or flaps. Plasma actuators may also increase the effectiveness of these control surfaces.

Currently available plasma actuators may not operate as desired or provide the desired amount of forcing under various pressures. As one example, currently available plasma actuators may become non-operational at unpredicted times. Additionally, currently available plasma actuators also may require more maintenance than desired.

Accordingly, it would be advantageous to have a method and apparatus which takes into account one or more of the issues discussed above, as well as possibly other issues.

SUMMARY

In one advantageous embodiment, an apparatus may comprise a first number of layers of a flexible material, a second number of layers of a dielectric material, a first electrode attached to a surface layer in the first number of layers, and a second electrode attached to a second layer in one of the first number of layers and the second number of layers. The first number of layers may be interspersed with the second number of layers. The first electrode may be configured to be exposed to air. The first electrode and the second electrode may be configured to form a plasma in response to a voltage.

In another advantageous embodiment, a plasma actuator may comprise a first number of layers of a flexible material, a second number of layers of a dielectric material, a first electrode attached to a first surface layer in the first number of layers, a second electrode attached to a second layer in one of the first number of layers and the second number of layers, a connector associated with the first electrode, and a third electrode attached to the surface layer in the first number of layers. Each of the first number of layers may have a dielectric constant of about two to about four and a dielectric strength of about three kilovolts per thousandths of an inch. The flexible material may be fluorinated ethylene propylene and may be thermoplastic. The dielectric material may be selected from one of a polyimide film and 4,4'-oxydiphenylene-pyromellitimide. The first number of layers may be interspersed with the second number of layers by alternating between a layer of the flexible material and a layer of the dielectric material. The first number of layers and the second number of layers may form a laminate. Each of the first number of layers and the second number of layers may have a thickness from about one thousandth of an inch to about 10 thousandths of an inch. The flexible material may have a greater flexibility than the dielectric material. The first electrode may be configured to be exposed to air. The first electrode may have a first elongate section with a plurality of second elongate sections extending from the first elongate section. The first electrode and the second electrode may be configured to form a plasma in response to a voltage. The first number of layers, the second number of layers, the first electrode, and the second electrode may form a plasma actuator, and the plasma actuator may have at least one of a desired flexibility that is configured to conform to a curved surface configured for airflow, a desired formability, a desired durability, a desired heat resistance, and a desired environmental resistance. The curved surface may be selected from one of a leading edge of a section of an airfoil, a trailing edge of a section of an airfoil, a duct, an inlet, a section of a strut, a section of a stabilizer, a rudder, and a section of a fuselage. The first number of layers of the flexible material and the second number of layers of the dielectric material may be configured to reduce arcing between the first electrode and the second electrode. The connector may extend through the first number of layers and the second number of layers to a second surface layer opposite the first surface layer.

In yet another advantageous embodiment, a method for manufacturing a plasma actuator may comprise bonding a first number of layers of a flexible material and a second number of layers of a dielectric material with each other to form a plurality of layers. The plurality of layers may be interspersed. A surface layer of the plurality of layers may comprise a layer of the flexible material. The flexible material may have a greater flexibility than the dielectric material. A first electrode may be attached to the surface layer. The first electrode may be configured to be exposed to air. A second electrode may be attached to a second layer in one of the first number of layers and the second number of layers. The first electrode and the second electrode may be configured to form a plasma in response to a voltage.

In another advantageous embodiment, method for manufacturing a plasma actuator may comprise bonding a first number of layers of a flexible material and a second number of layers of a dielectric material with each other to form a plurality of layers. The plurality of layers may be interspersed by alternating between a layer in the first number of layers of the flexible material and a layer in the second number of layers of the dielectric material. A first surface layer of the plurality of layers may comprise a layer of the flexible material. Each of the first number of layers may have a dielectric constant of about two to about four and a dielectric strength of about three kilovolts per thousandths of an inch. The flexible material may be selected from one of fluorinated ethylene propylene, polytetrafluoroethylene, nylon, a fluorocarbon, a polyamide, a polyester, a polyethylene, a silicone tape, a thermoplastic flexible material, and a polyurethane and may be thermoplastic. The dielectric material may be selected from one of a polyimide film and 4,4'-oxydiphenylene-pyromellitimide. The first number of layers and the second number of layers may form a laminate. Each of the first number of layers and the second number of layers may have a thickness from about one thousandth of an inch to about 10 thousandths of an inch. The flexible material may have a greater flexibility than the dielectric material. A first electrode may be attached to the first surface layer. The first electrode may be configured to be exposed to air. The first electrode may have a first elongate section with a plurality of second elongate sections extending from the first elongate section. The first electrode may be associated with a connector. The connector may extend through the first number of layers and the second number of layers to a second surface layer opposite the first surface layer. A second electrode may be attached to a second layer in one of the first number of layers and the second number of layers. The first electrode and the second electrode may be configured to form a plasma in response to a voltage. The first number of layers, the second number of layers, the first electrode, and the second electrode may form the plasma actuator, and the plasma actuator may have at least one of a desired flexibility that is configured to conform to a curved surface configured for airflow, a desired formability, a desired durability, a desired heat resistance, and a desired environmental resistance. The curved surface may be selected from one of a leading edge of a section of an airfoil, a trailing edge of a section of an airfoil, a duct, an inlet, a section of a strut, a section of a stabilizer, a rudder, and a section of a fuselage. The first number of layers of the flexible material and the second number of layers of the dielectric material may be configured to reduce arcing between the first electrode and the second electrode.

In yet another advantageous embodiment, a method may be present for controlling airflow. A plasma formed by a number of plasma actuators may be changed. Each of the number of plasma actuators may be configured to form the plasma in response to a voltage. The number of plasma actuators may be associated with a surface. Airflow over the surface may be modified in response to changing the plasma.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 9 is an illustration of a cross-sectional view of a plasma actuator in accordance with an advantageous embodiment;

FIG. 12 is an illustration of a plasma actuator in accordance with an advantageous embodiment;

DETAILED DESCRIPTION

Figure 1:
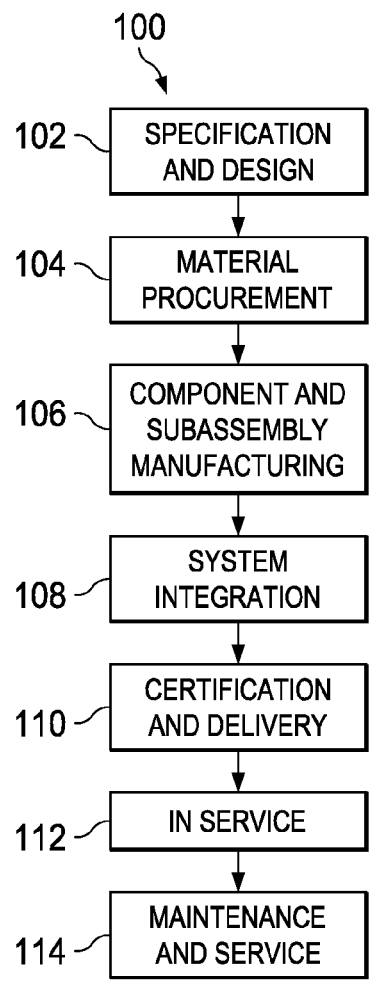
FIG. 1 is an illustration of an aircraft manufacturing and service method in accordance with an advantageous embodiment.
Figure 2:
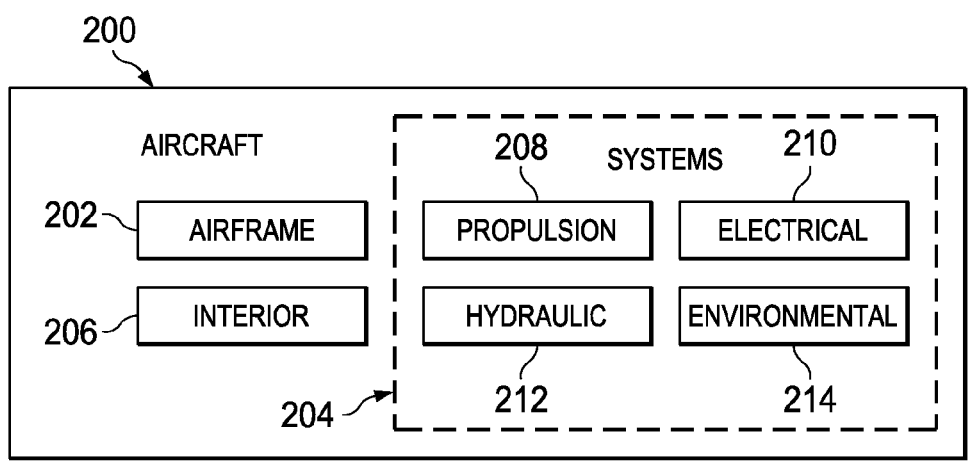
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 may take place. Thereafter, aircraft 200 in FIG. 2 may go through certification and delivery 110 in order to be placed in service 112. While in service 112 by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and majorsystem subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 may be produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry. For example, without limitation, plasma actuators, in accordance with an advantageous embodiment, may be implemented in automobiles to control the airflow over surfaces of automobiles.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of different considerations. For example, the different advantageous embodiments recognize and take into account that currently, manufactured plasma actuators may not perform as desired when electrical arcs occur. The two electrodes in a plasma actuator may be separated from each other by an insulator. The insulator may be formed using a dielectric material. However, in some cases, an electrical arc may occur between the electrodes separated by the insulator. For example, if an electrical arc occurs between the electrodes of the plasma actuator, the dielectric material between the electrodes may not have the desired properties to form a plasma with the desired characteristics. This change in the dielectric material may leave a carbon track or may vaporize an electrode. As a result, the plasma actuator may no longer perform at the desired level.

The different advantageous embodiments recognize and take into account that electrical arcs may be caused by air gaps or porosity in the material used to lay up the structure for a plasma actuator. These air gaps and/or air porosity may cause local ionization heating and inability of the plasma actuator to perform as desired. The heating and change in performance may be caused by arcing or overheating. Further, the different advantageous embodiments recognize that, oftentimes, electrodes may have rough, uneven edges, which may cause electric fields of less than desired capacity.

Some materials that may be used, such as polyimides, may be stiff and may not flex sufficiently to conform to curved surfaces. An example of such a polyimide is Kapton®, which is available from DuPont. Additionally, the different advantageous embodiments recognize other materials that may be used to manufacture plasma actuators include photolithographic circuit boards. The materials for these boards also may be stiff and may not be well suited for mounting on a curved surface, such as an airfoil.

The different advantageous embodiments also recognize and take into account that Kapton® may be degraded by ozone that occurs in the plasma discharge. As a result, the properties of Kapton® may be reduced. Further, through use, delamination also may occur for the different layers.

Thus, a number of the different advantageous embodiments provide a method and apparatus for a plasma actuator. An apparatus may comprise a first number of layers of a flexible material, a second number of layers of a dielectric material, a first electrode, and a second electrode. The flexible material may have a greater flexibility than the dielectric material. The first number of layers and the second number of layers may alternate between a layer of the flexible material and a layer of the dielectric material. The first electrode may be attached to the surface layer in the first number of layers in which the first electrode is configured to be exposed to air. The second electrode may be attached to a second layer in a number of layers. The first electrode and the second electrode may be configured to form a plasma field in response to a voltage.

Figure 3:
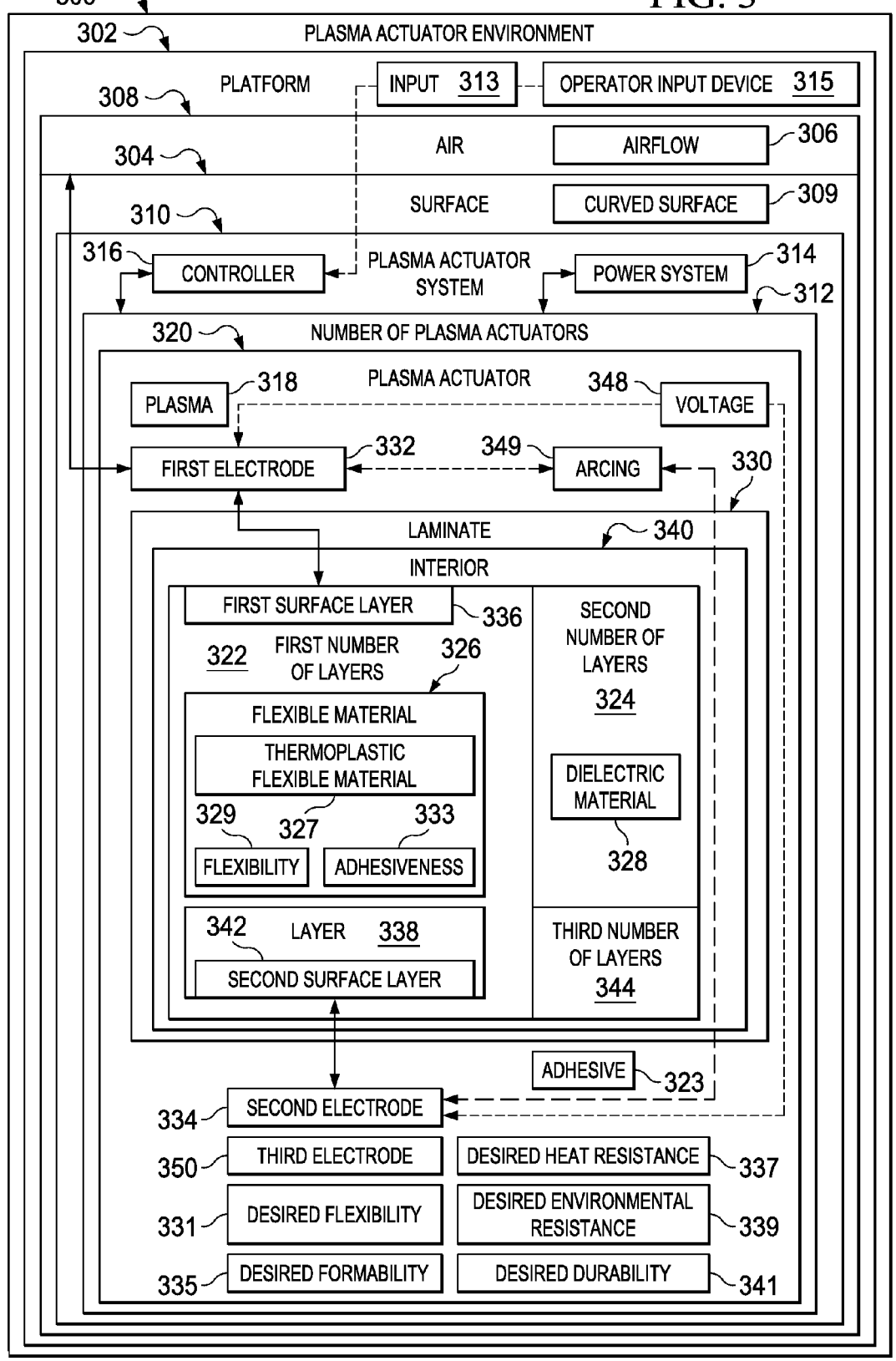
FIG. 3 is an illustration of a plasma actuator environment in accordance with an advantageous embodiment.

With reference now to FIG. 3, an illustration of a plasma actuator environment is depicted in accordance with an advantageous embodiment. Plasma actuator environment 300 may be an example of an environment that may be implemented for aircraft 200 in FIG. 2.

In this illustrative example, plasma actuator environment 300 may include platform 302 with surface 304. Platform 302 may be, for example, without limitation, aircraft 200 in FIG. 2. Surface 304 may be configured for airflow 306. In other words, air 308 may flow over surface 304. In these illustrative examples, surface 304 may take a number of different forms.

For example, without limitation, surface 304 may be selected from one of a leading edge of a section of an airfoil, a trailing edge of a section of an airfoil, a duct, an inlet, a section of a strut, a section of a stabilizer, a rudder, a fuselage, and other suitable surfaces over which air 308 may flow. Further, surface 304 may take the form of curved surface 309. In these illustrative examples, plasma actuator system 310 may change airflow 306 over surface 304.

As illustrated, plasma actuator system 310 may include number of plasma actuators 312, power system 314, and controller 316. Number of plasma actuators 312 may change the flow of air 308 over surface 304 to change airflow 306. Number of plasma actuators 312 may generate plasma 318. Power system 314 may supply an alternating voltage to number of plasma actuators 312. This alternating current may cause the generation of plasma 318.

Controller 316 may control the generation of plasma 318 by number of plasma actuators 312. Controller 316 may receive input 313 from operator input device 315. Input 313 may cause controller 316 to change plasma 318 in a manner that changes airflow 306 over surface 304. The change in airflow 306 over surface 304 may control the movement of platform 302 when platform 302 takes the form of aircraft 200 in FIG. 2. Operator input device 315 may be, for example, without limitation, a flight stick, a yoke, a control column, a switch, a lever, a button, pedals, a computer, and/or other suitable input devices.

Plasma 318 may be created when at least a portion of the particles in air 308 in the vicinity of number of plasma actuators 312 is ionized. Plasma 318 changes airflow 306 over surface 304 in these illustrative examples.

In these illustrative examples, plasma actuator 320 is an example of one plasma actuator within number of plasma actuators 312. Plasma actuator 320 may include first number of layers 322 and second number of layers 324. First number of layers 322 may each be comprised of flexible material 326. Second number of layers 324 may each be comprised of dielectric material 328.

In this illustrative example, flexible material 326 may have flexibility 329. Flexible material 326 may also have adhesiveness 333. Further, flexible material 326 may be selected as thermoplastic flexible material 327. For example, flexible material 326 may be fluorinated ethylene propylene in this illustrative example. Fluorinated ethylene propylene may be available as Teflon®-FEP from DuPont. In other advantageous embodiments, flexible material 326 may be selected from one of polytetrafluoroethylene, nylon, a fluorocarbon, a polyamide, a polyester, a polyethylene, a silicone tape, a thermoplastic flexible material, a polyurethane, or some other suitable material.

Dielectric material 328 may be an electrical insulator that may be polarized when an electric field is applied. Dielectric material 328 may be selected from one of a polyimide film, 4,4'-oxydiphenylene-pyromellitimide, or some other suitable dielectric material 328.

First number of layers 322 and second number of layers 324 may form laminate 330. For example, first number of layers 322 and second number of layers 324 may be bonded with each other. The bonding of first number of layers 322 with second number of layers 324 may occur by first number of layers 322 adhering to second number of layers 324. For example, adhesiveness 333 of flexible material 326 may allow first number of layers 322 to adhere to second number of layers 324.

Laminate 330 may be configured such that first number of layers 322 may be interspersed with second number of layers 324. In this illustrative example, first number of layers 322 may be interspersed with second number of layers 324 by alternating between a layer in first number of layers 322 of flexible material 326 and a layer in second number of layers 324 of dielectric material 328 in laminate 330.

In some illustrative examples, more than one layer of first number of layers 322 may be adhered to each other and/or more than one layer of second number of layers 324 may be adhered to each other in laminate 330. For example, two or more layers of first number of layers 322 may be in between two layers of second number of layers 324 and/or two or more layers of second number of layers 324 may be in between two layers of first number of layers 322.

Flexible material 326 may be selected such that flexibility 329 of flexible material 326 is greater than a flexibility of dielectric material 328. Interspersing first number of layers 322 of flexible material 326 with second number of layers 324 of dielectric material 328 in laminate 330 may allow laminate 330 to bend to conform to curved surface 309. In other words, interspersing flexible material 326 with dielectric material 328 may provide plasma actuator 320 with desired flexibility 331. Desired flexibility 331 of plasma actuator 320 may be such that plasma actuator 320 may be configured to conform to curved surface 309.

Further, in these illustrative examples, laminate 330 may be configured to be attached to curved surface 309. Laminate 330 may be attached to curved surface 309 by adhering to curved surface 309 using adhesive 323. In these examples, a layer in first number of layers 322 of flexible material 326 may be used as adhesive 323 to attach laminate 330 to curved surface 309. In other examples, adhesive 323 may take the form of a glue or some other suitable type of adhesive.

Further, interspersing flexible material 326 with dielectric material 328 may provide plasma actuator 320 with at least one of desired formability 335, desired durability 341, desired heat resistance 337, desired environmental resistance 339, and other desired features. Desired formability 335 may allow plasma actuator 320 to be formed into a desired shape. Plasma actuator 320 may be formed into the desired shape using, for example, without limitation, a heat forming process.

Desired durability 341 may allow plasma actuator 320 to have a reduced number of inconsistencies in plasma actuator 320 over time. Desired heat resistance 337 may be the ability of plasma actuator 320 to withstand heat up to a selected temperature. Desired environmental resistance 339 may allow plasma actuator 320 to withstand environmental factors, such as, for example, wind, snow, rain, chemicals, air, and/or other environmental factors.

Laminate 330 with dielectric material 328, but without flexible material 326, may not provide desired flexibility 331 for a same thickness of laminate 330 with flexible material 326 and dielectric material 328. In this illustrative example, laminate 330, with both flexible material 326 and dielectric material 328, may be configured to provide desired environmental resistance, desired mechanical durability, and desired electrical properties.

For example, without limitation, laminate 330 may be configured to provide resistance against undesired temperatures, chemicals, ultraviolet radiation, and/or other environmental factors. Further, laminate 330 may be configured to withstand shock and/or fatigue. In these examples, laminate 330 may be configured to provide a desired dielectric strength, a desired impedance, a desired capacitance, and/or other desired electrical properties.

Additionally, plasma actuator 320 also may include first electrode 332 and second electrode 334. First electrode 332 may be attached to first surface layer 336 in first number of layers 322. First surface layer 336 may be a surface layer for laminate 330. In this manner, first electrode 332 may be configured to be exposed to air 308 in these examples.

Second electrode 334 may be attached to layer 338 in first number of layers 322. Layer 338 may be located in interior 340 of laminate 330. In some illustrative examples, layer 338 may be second surface layer 342 for laminate 330. In this example, second surface layer 342 may be opposite of first surface layer 336.

First electrode 332 and second electrode 334 may be configured to form plasma 318 in response to the application of voltage 348 to first electrode 332 and second electrode 334. In these illustrative examples, first number of layers 322 of flexible material 326 and second number of layers 324 of dielectric material 328 may be configured to reduce arcing 349 between first electrode 332 and second electrode 334. In other words, discharge of plasma 318 between first electrode 332 and second electrode 334 may be reduced.

First electrode 332 and second electrode 334 may be comprised of conductive materials. These conductive materials may be selected based on a number of factors, which may include, without limitation, electrical conductivity, environmental resistance, flexibility, and/or other suitable factors. For example, first electrode 332 and second electrode 334 may be comprised of copper, aluminum, steel, nickel, titanium, titanium alloys, metal alloys, or some other suitable conductive material.

The illustration of plasma actuator environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, third electrode 350 may be attached to at least one of first number of layers 322 and second number of layers 324. For example, third electrode 350 may be attached to first surface layer 336 in first number of layers 322. In other advantageous embodiments, plasma actuator 320 may include additional layers in addition to first number of layers 322 and second number of layers 324.

For example, without limitation, plasma actuator 320 may include third number of layers 344. Each of third number of layers 344 may be comprised of a material, such as a meta-aramid material. The meta-aramid material may be, for example, without limitation, Nomex®, available from DuPont.

In still other advantageous embodiments, platform 302 may take other forms other than aircraft 200. For example, the different advantageous embodiments recognize that platform 302 may take other forms, such as a mobile platform, a stationary platform, a land-based structure, an aquatic-based structure, a space-based structure, and/or some other suitable object. More specifically, the different advantageous embodiments may be applied to platform 302 in the form of, for example, without limitation, a bus, a personnel carrier, a tank, a train, an automobile, a spacecraft, a surface ship, a power plant, a dam, a manufacturing facility, a building, and/or some other suitable object.

Figure 4:
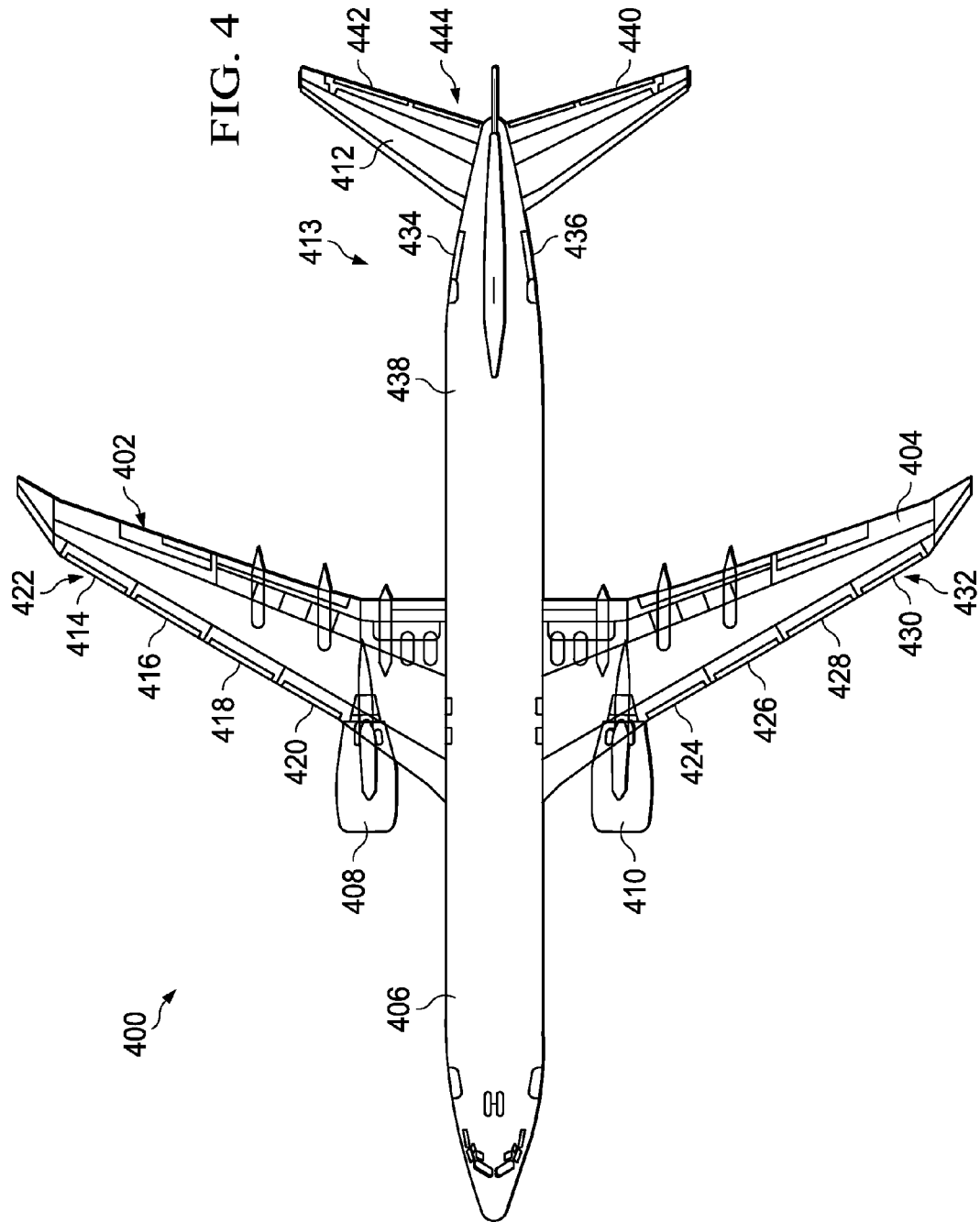
FIG. 4 is an illustration of an aircraft in which an advantageous embodiment may be implemented.

With reference now to FIG. 4, an illustration of an aircraft is depicted in which an advantageous embodiment may be implemented. Aircraft 400 may be an example of one implementation of aircraft 200 in FIG. 2 and an example of one implementation for platform 302 in FIG. 3. In this illustrative example, aircraft 400 may have wings 402 and 404 attached to fuselage 406. Aircraft 400 may include wing-mounted engine 408, wing-mounted engine 410, and tail 412.

In these illustrative examples, plasma actuators 413 are attached to various surfaces of aircraft 400. As depicted, plasma actuators 414, 416, 418, and 420 may be located on leading edge 422 of wing 402. Plasma actuators 424, 426, 428, and 430 may be located on leading edge 432 of wing 404. Plasma actuators 434 and 436 may be located on surface 438 of fuselage 406. Plasma actuators 440 and 442 may be located on trailing edge 444 of tail 412.

In this illustrative example, plasma actuators 414, 416, 418, 420, 424, 426, 428, 430, 434, 436, 440, and 442 may be examples of number of plasma actuators 312 in FIG. 3. In particular, plasma actuators 414, 416, 418, 420, 424, 426, 428, 430, 434, 436, 440, and 442 may be examples of plasma actuator 320 in FIG. 3. In the different advantageous embodiments, any number of plasma actuators may be located on any surface of aircraft 400 to control the flow of air over the surface.

Figure 5:
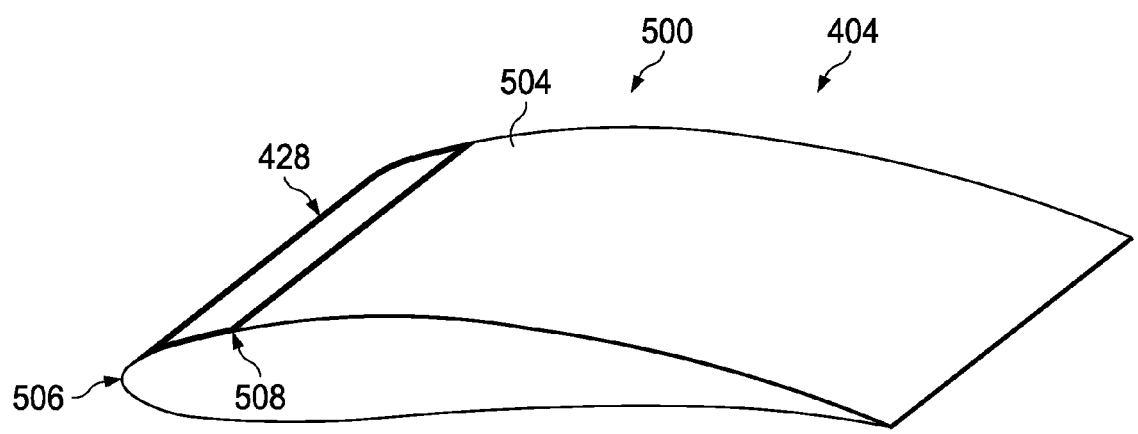
FIG. 5 is an illustration of a portion of a wing in accordance with an advantageous embodiment.

Turning now to FIG. 5, an illustration of a portion of a wing is depicted in accordance with an advantageous embodiment. In this illustrative example, portion 500 of wing 404 is depicted. In this example, plasma actuator 428 may be associated with surface 504 of portion 500 of wing 404.

As can be seen in this example, plasma actuator 428 may be located on leading edge 506 of wing 404. Plasma actuator 428 conforms to curved surface 508 of leading edge 506 of wing 404. Plasma actuator 428 may be configured to control the flow of air over surface 504.

In this illustrative example, plasma actuator 428 may be attached to curved surface 508. For example, plasma actuator 428 may take the form of an appliqué attached to curved surface 508. Plasma actuator 428 may be attached to curved surface 508 by adhering a side of plasma actuator 428 having an adhesive, such as adhesive 323 in FIG. 3, to curved surface 508.

Figure 6:
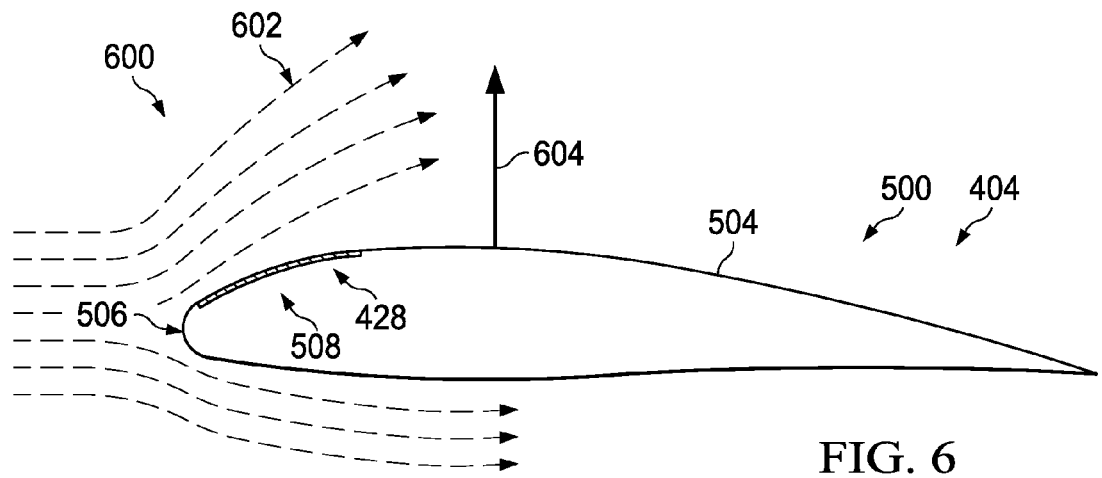
FIG. 6 is an illustration of a cross section of a portion of a wing with a plasma actuator in accordance with an advantageous embodiment.

With reference now to FIG. 6, an illustration of a cross section of a portion of a wing with a plasma actuator is depicted in accordance with an advantageous embodiment. In this illustrative example, a cross section of portion 500 of wing 404 having plasma actuator 428 is depicted. Plasma actuator 428 has not yet been activated to form a plasma, such as plasma 318 in FIG. 3, in this depicted example.

Air 600 may move around portion 500 of wing 404 in this illustrative example. As depicted, the flow of air 600 over surface 504 of leading edge 506 of wing 404 may separate from surface 504. In other words, airflow 602 over surface 504 may not follow the shape of surface 504 as closely as desired. For example, without limitation, airflow 602 may not follow curved surface 508 as closely as desired. Also, in this depicted example, wing 404 may provide lift 604.

Figure 7:
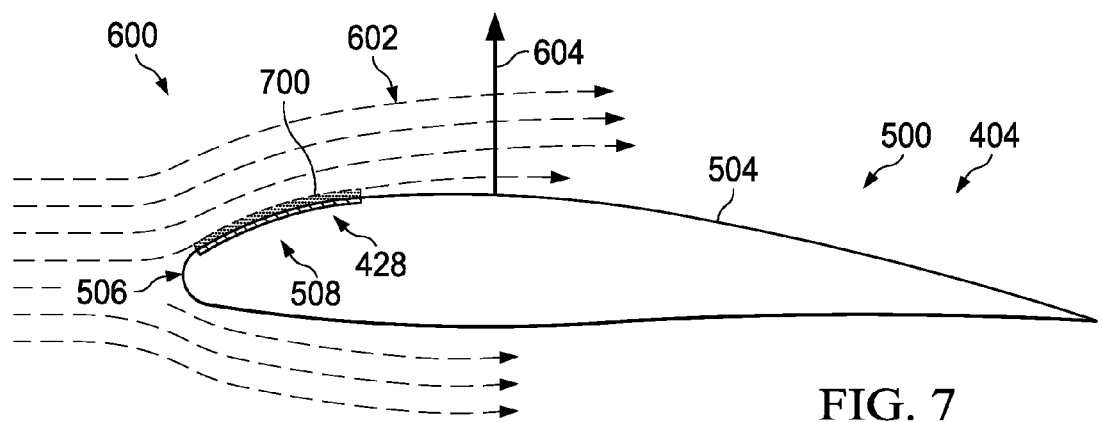
FIG. 7 is an illustration of a cross section of a portion of a wing having a plasma actuator in accordance with an advantageous embodiment.

Turning now to FIG. 7, an illustration of a cross section of a portion of a wing having a plasma actuator is depicted in accordance with an advantageous embodiment. In this illustrative example, plasma actuator 428 may be activated and may form plasma 700 over plasma actuator 428.

As depicted, plasma 700 may cause airflow 602 over surface 504 to follow the shape of surface 504 more closely as compared to when plasma 700 is not present. For example, without limitation, plasma 700 may cause airflow 602 to follow the curve of curved surface 508 more closely. In other illustrative examples, the amount of plasma 700 formed may be changed to adjust how closely airflow 602 follows the shape of surface 504.

Changing plasma 700 to change airflow 602 may also change lift 604. For example, without limitation, lift 604 may be increased or decreased, depending on the change to the amount of plasma 700 formed. Further, changes to plasma 700 may cause changes to other aerodynamic characteristics, such as, for example, without limitation, drag and/or other suitable aerodynamic characteristics.

Figure 8:
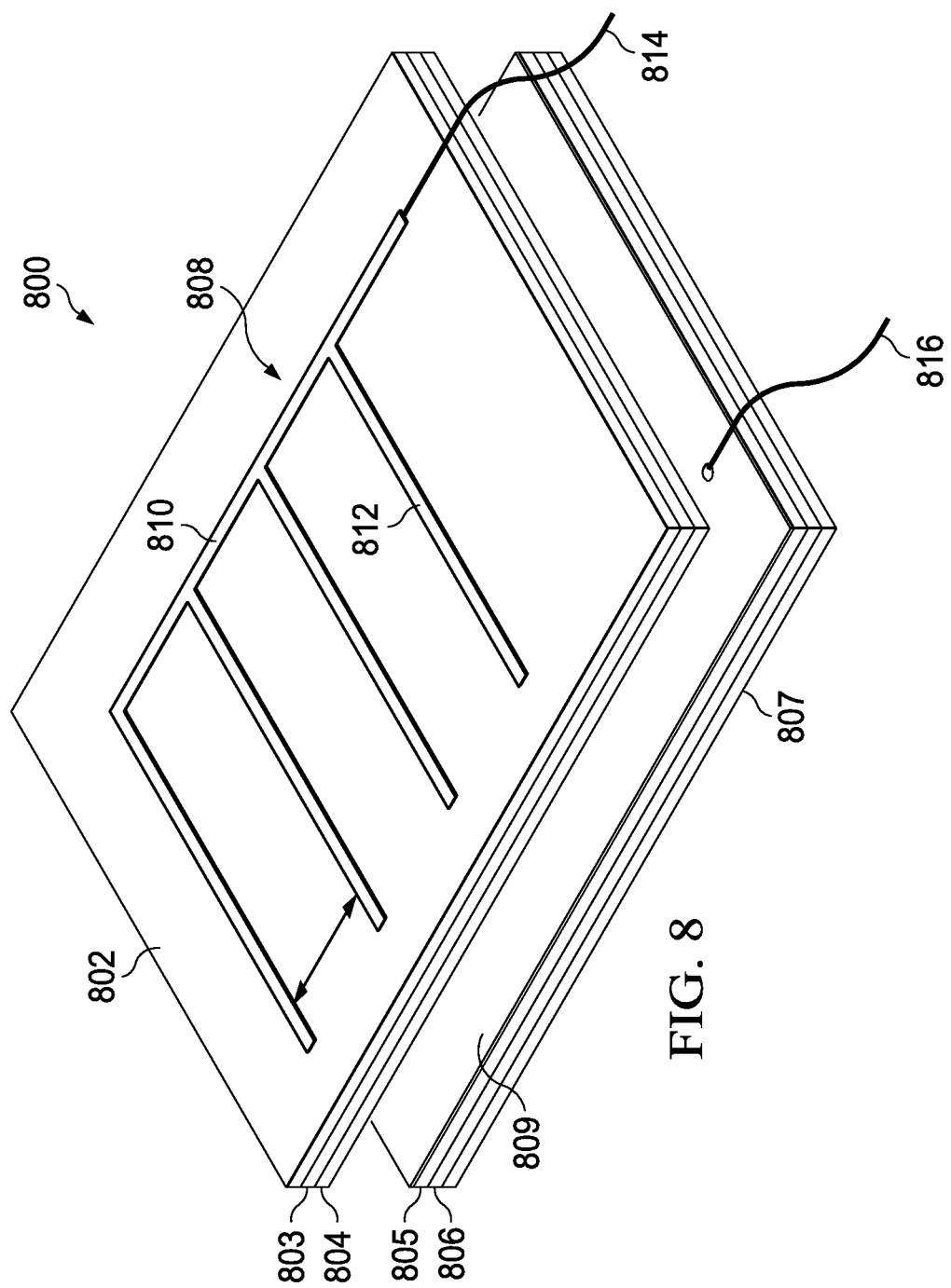
FIG. 8 is an illustration of a plasma actuator in accordance with an advantageous embodiment.

With reference now to FIG. 8, an illustration of a plasma actuator is depicted in accordance with an advantageous embodiment. In this illustrative example, plasma actuator 800 is an example of one implementation for plasma actuator 320 in FIG. 3. Further, plasma actuator 800 may be an example of one implementation for a plasma actuator in plasma actuators 413 in FIG. 4.

As depicted, plasma actuator 800 may include first surface layer 802, layer 803, layer 804, layer 805, layer 806, second surface layer 807, first electrode 808, and second electrode 809. In this depicted example, plasma actuator 800 is shown prior to all layers in plasma actuator 800 being laminated together. In other words, first surface layer 802, layer 803, layer 804, layer 805, layer 806, and second surface layer 807 have not yet been formed into a laminate, such as laminate 330 in FIG. 3.

First surface layer 802, layer 804, layer 805 and second surface layer 807 may be comprised of a flexible material, such as flexible material 326 in FIG. 3. This flexible material may be Teflon®-FTP in this illustrative example. Further, first surface layer 802 and second surface layer 807 may provide an environmental barrier for plasma actuator 800. Layer 803 and layer 806 may be comprised of a dielectric material, such as dielectric material 328 in FIG. 3. This dielectric material may be Kapton®.

In this illustrative example, first electrode 808 has first elongate section 810 and plurality of elongate sections 812. Plurality of elongate sections 812 extends from first elongate section 810 substantially perpendicular to first elongate section 810 in this illustrative example. First electrode 808 may be comprised of copper, aluminum, steel, nickel, titanium and their alloys, and other conductive materials in this illustrative example.

As depicted, lead 814 and lead 816 may be attached to first electrode 808 and second electrode 809, respectively. A voltage may be applied to electrode 808 and second electrode 809 through lead 814 and lead 816, respectively, to form a plasma, such as plasma 318 in FIG. 3.

With reference now to FIG. 9, an illustration of a cross-sectional view of a plasma actuator is depicted in accordance with an advantageous embodiment. In this illustrative example, plasma actuator 900 is an example of one implementation for plasma actuator 320 in FIG. 3. Further, plasma actuator 900 may be an example of one implementation for a plasma actuator in plasma actuators 413 in FIG. 4.

As depicted, plasma actuator 900 may include first surface layer 902, inner layer 904, second surface layer 906, first electrode 908, and second electrode 910. First surface layer 902 and second surface layer 906 may be comprised of a dielectric material, such as Kapton®. Inner layer 904 may be comprised of a flexible material, such as Teflon®-FEP.

First surface layer 902, inner layer 904, and second surface layer 906 may form laminate 912 in this depicted example. Laminate 912 is an example of one implementation for laminate 330 in FIG. 3.

First electrode 908 may be attached to first surface layer 902. Second electrode 910 may be attached to second surface layer 906. In these illustrative examples, an electrode may be attached to a layer in laminate 912 by being bonded to the layer. In other illustrative examples, the electrode may be attached to the layer by melting at least a portion of the material in the layer and then allowing the material to reform around a connector for the electrode.

Figure 10:
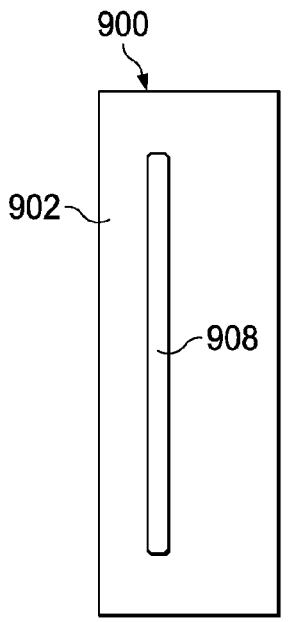
FIG. 10 is an illustration of a top view of a plasma actuator in accordance with an advantageous embodiment.

With reference now to FIG. 10, an illustration of a top view of a plasma actuator is depicted in accordance with an advantageous embodiment. In this illustrative example, a top view of plasma actuator 900 in FIG. 9 is shown. As depicted, first electrode 908 is seen attached to first surface layer 902.

Figure 11:
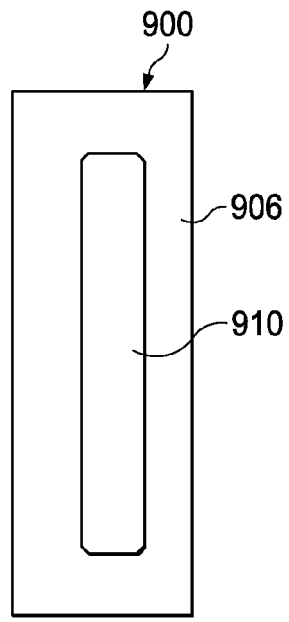
FIG. 11 is an illustration of a bottom view of a plasma actuator in accordance with an advantageous embodiment.

With reference now to FIG. 11, an illustration of a bottom view of a plasma actuator is depicted in accordance with an advantageous embodiment. In this illustrative example, a bottom view of plasma actuator 900 in FIG. 9 is shown. As depicted, second electrode 910 is seen attached to second surface layer 906.

With reference now to FIG. 12, an illustration of a plasma actuator is depicted in accordance with an advantageous embodiment. In this illustrative example, plasma actuator 1200 is an example of one implementation for plasma actuator 320 in FIG. 3. Further, plasma actuator 1200 may be an example of one implementation for a plasma actuator in plasma actuators 413 in FIG. 4.

As depicted, plasma actuator 1200 includes first surface layer 1202, layer 1204, layer 1206, layer 1208, layer 1210, and second surface layer 1212. In this illustrative example, first surface layer 1202, layer 1206, and layer 1210 may be comprised of a flexible material, such as Teflon®-FEP. Layer 1204, layer 1208, and second surface layer 1212 may be comprised of a dielectric material, such as Kapton®. First surface layer 1202, layer 1204, layer 1206, layer 1208, layer 1210, and second surface layer 1212 may form laminate 1211.

Plasma actuator 1200 may also include first electrode 1213 and second electrode 1214. First electrode 1213 may be attached to first surface layer 1202. Second electrode 1214 may be attached to layer 1206 and layer 1210 and located between outer portion 1215 of layer 1208 and outer portion 1217 of layer 1208.

Further, second electrode 1214 may be encapsulated by layer 1208, layer 1210, and second surface layer 1212. This encapsulation of second electrode 1214 may reduce and/or prevent arcing to nearby objects and/or coronal discharge. Coronal discharge may cause an undesired dissipation of power.

As depicted, channel 1218 and connector 1216 in channel 1218 may extend from first electrode 1213 through first surface layer 1202, layer 1204, layer 1206, layer 1208, layer 1210, and second surface layer 1212 of laminate 1211. A lead may be attached to connector 1216 such that a voltage may be applied to first electrode 1213.

In a similar manner, channel 1222 and connector 1220 in channel 1222 may extend from second electrode 1214 through layer 1210 and second surface layer 1212 of laminate 1211. In other illustrative examples, a lead (not shown) may be attached to connector 1220 such that a voltage may be applied to second electrode 1214.

In the different advantageous embodiments, physical components and/or features may be built into laminate 1211 to allow for plasma actuator 1200 to be fastened to and/or aligned with a surface of a platform, such as surface 304 of platform 302 in FIG. 3.

Figure 13:
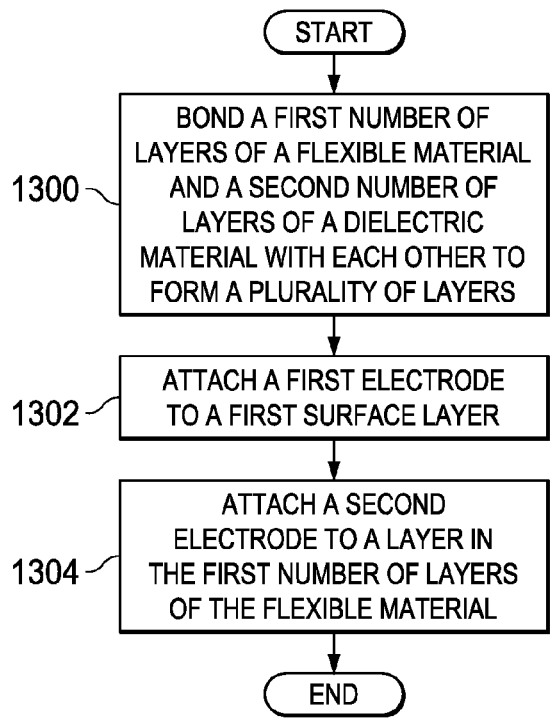
FIG. 13 is an illustration of a flowchart of a process for manufacturing a plasma actuator in accordance with an advantageous embodiment.

With reference now to FIG. 13, an illustration of a flowchart of a process for manufacturing a plasma actuator is depicted in accordance with an advantageous embodiment. The process illustrated in FIG. 13 may be implemented in plasma actuator environment 300 in FIG. 3. Further, the process may be implemented to manufacture plasma actuator 320 in FIG. 3.

The process may begin by bonding first number of layers 322 of flexible material 326 and second number of layers 324 of dielectric material 328 with each other to form a plurality of layers (operation 1300). In operation 1300, the bonding of first number of layers 322 with second number of layers 324 may be through the adhering of first number of layers 322 to second number of layers 324. The adhesive properties of flexible material 326 may allow first number of layers 322 to be adhered to second number of layers 324.

Further, in some illustrative examples, first number of layers 322 and second number of layers 324 may be bonded with each other using automated fabrication techniques or other lamination techniques.

The plurality of layers may form laminate 330. The plurality of layers may have an order that alternates between a layer in first number of layers 322 of flexible material 326 with a layer in second number of layers 324 of dielectric material 328. First number of layers 322 of flexible material 326 may include first surface layer 336. In this illustrative example, flexible material 326 may have flexibility 329, which is greater than a flexibility of dielectric material 328.

Thereafter, the process may attach first electrode 332 to first surface layer 336 (operation 1302). First electrode 332 may be configured to be exposed to air 308. In operation 1302, first electrode 332 may be attached to first surface layer 336 by being bonded to first surface layer 336. In some illustrative examples, first electrode 332 may be attached to first surface layer 336 by melting at least a portion of flexible material 326 in first surface layer 336 and allowing the melted portion of flexible material 326 to reform around first electrode 332. Although the melted portion of flexible material 326 may reform around first electrode 332, at least a portion of first electrode 332 may be exposed to air 308.

The process may then attach second electrode 334 to layer 338 in first number of layers 322 of flexible material 326 (operation 1304), with the process terminating thereafter. Layer 338 may be, in some illustrative examples, second surface layer 342. First electrode 332 and second electrode 334 may be configured to form plasma 318 in response to voltage 348 being applied to first electrode 332 and second electrode 334.

In this illustrative example, first number of layers 322, second number of layers 324, first electrode 332, and second electrode 334 form plasma actuator 320. Plasma actuator 320 may be used to change airflow 306 over surface 304 of platform 302.

In other illustrative examples, operation 1302 and operation 1304 may also be performed by depositing first electrode 332 and second electrode 334 using chemical vapor deposition methods. In still other examples, operation 1302 and operation 1304 may be performed using semiconductor processing techniques, etching techniques, printed circuit board wiring techniques, sputtering techniques, direct write, and/or other suitable methods.

Figure 14:
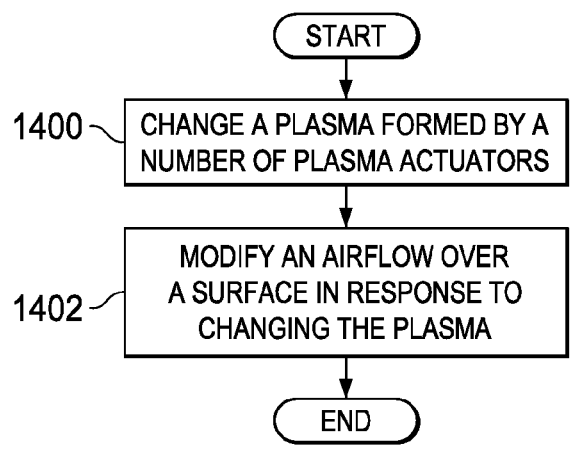
FIG. 14 is an illustration of a flowchart of a process for controlling airflow in accordance with an advantageous embodiment.

With reference now to FIG. 14, an illustration of a flowchart of a process for controlling airflow is depicted in accordance with an advantageous embodiment. The process illustrated in FIG. 14 may be implemented in plasma actuator environment 300 in FIG. 3. Further, this process may be implemented using plasma actuator system 310 in FIG. 3.

The process may begin by changing plasma 318 formed by number of plasma actuators 312 (operation 1400). In operation 1400, each of number of plasma actuators 312 may be manufactured using the process described in FIG. 14. Further, each of number of plasma actuators 312 may be comprised of first number of layers 322 of flexible material 326, second number of layers 324 of dielectric material 328, first electrode 332, and second electrode 334.

Plasma 318 may be formed by first electrode 332 and second electrode 334 in each of number of plasma actuators 312 in response to a voltage being applied to first electrode 332 and second electrode 334. Number of plasma actuators 312 may be associated with surface 304 of platform 302.

In operation 1400, changing plasma 318 may be comprised of at least one of ceasing the forming of plasma 318, starting the forming of plasma 318, and changing the amount of plasma 318 formed. For example, without limitation, plasma 318 may be changed by changing an absence of plasma 318 to a presence of plasma 318 using number of plasma actuators 312. Further, changing plasma 318 may include changing plasma 318 from a current amount of plasma 318 to a different amount of plasma 318.

The process may then modify airflow 306 over surface 304 in response to changing plasma 318 (operation 1402), with the process terminating thereafter. Plasma 318 may be changed in operation 1400 to reduce a separation of airflow 306 from surface 304 in operation 1402. In other words, in operation 1402, airflow 306 may be modified such that the movement of air 308 over surface 304 more closely follows the shape of surface 304 in the presence of plasma 318 as compared to in the absence of plasma 318.

Figure 15:
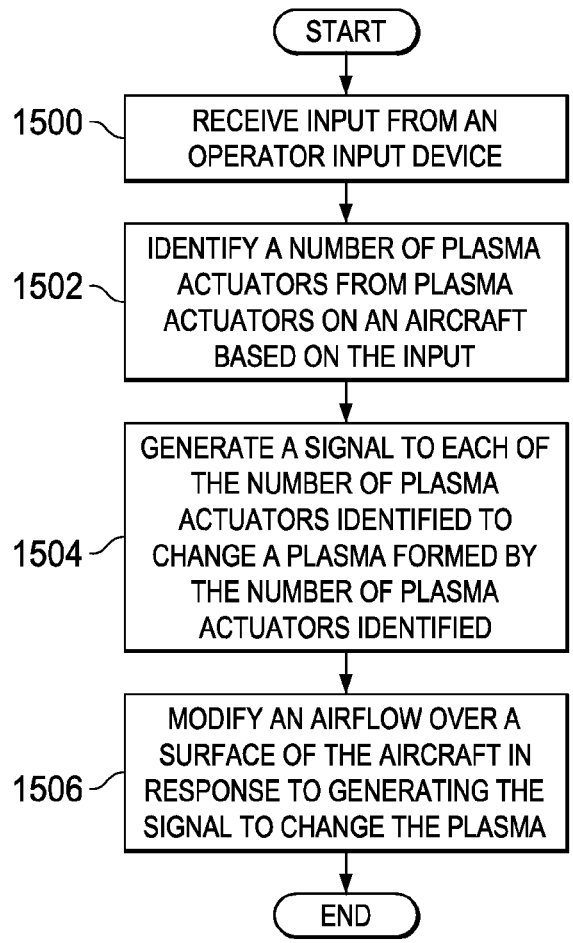
FIG. 15 is an illustration of a flowchart of a process of controlling airflow over a surface of an aircraft in accordance with an advantageous embodiment.

With reference now to FIG. 15, an illustration of a flowchart of a process of controlling airflow over a surface of an aircraft is depicted in accordance with an advantageous embodiment. The process illustrated in FIG. 15 may be implemented in plasma actuator environment 300 in FIG. 3. Further, this process may be implemented for controlling airflow 306 over platform 302 in the form of aircraft 400 in FIG. 4.

The process may begin by receiving input 313 from operator input device 315 (operation 1500). Input 313 may identify a maneuver to be performed by aircraft 400. For example, input 313 may identify a turn, a climb, a descent, or some other suitable type of maneuver for aircraft 400. In this illustrative example, operator input device 315 may take the form of, for example, without limitation, a flight stick, a yoke, a control column, a switch, a lever, a button, pedals, a computer, or some other suitable operator input device on aircraft 400.

In other illustrative examples, input 313 may be generated by a pilot on board aircraft 400. Input 313 may then be processed by operator input device 315 in the form of a computer.

In other illustrative examples, operator input device 315 may take the form of a computer or a remotely-controlled input device not on aircraft 400. In other words, in some cases, the operator may be a person, while in another cases, the operator may be a computer program. The computer program may be used with, for example, without limitation, an unmanned aerial vehicle.

The process may then identify a number of plasma actuators from plasma actuators 413 on aircraft 400 based on input 313 (operation 1502). For example, when input 313 identifies a turn maneuver for aircraft 400, the process may identify plasma actuators 414, 416, 418, and 420 on wing 402 and plasma actuators 424, 426, 428, and 430 on wing 404. These plasma actuators may be used when performing the turn maneuver.

Thereafter, the process may generate a signal to each of the number of plasma actuators identified to change plasma 318 formed by the number of plasma actuators identified (operation 1504). As one illustrative example, in the absence of plasma 318, the signal may activate the number of plasma actuators identified to form plasma 318. As another illustrative example, the signal may cause the number of plasma actuators to change the amount of plasma 318 formed.

The process may then modify airflow 306 over the surface of aircraft 400 in response to generating the signal to change plasma 318 (operation 1506), with the process terminating thereafter. In operation 1506, airflow 306 may be modified over the surfaces of wing 402 and wing 404 in aircraft 400, in particular, using the number of plasma actuators identified. As a result, this process may change the movement of aircraft 400.

In this illustrative example, airflow 306 over the surfaces of wing 402 and wing 404 may be modified to change the lift for wing 402 and wing 404 to perform the turn maneuver identified from input 313.

The flowchart and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for controlling airflow, the method comprising:
    changing a plasma formed by a number of plasma actuators in which the number of plasma actuators is configured to form the plasma in response to a voltage and in which the number of plasma actuators is associated with a surface, each of the number of plasma actuators comprising:
        a plurality of layers comprising a first number of layers of a flexible material and a second number of layers of a dielectric material in which the first number of layers is interspersed with the second number of layers and in which the flexible material has a greater flexibility than the dielectric material;
        a first electrode attached to a first layer, in which the first layer is a surface layer in the first number of layers, and in which the first electrode is configured to be exposed to air; and
        a second electrode attached to a second layer, in which the second layer is a layer in one of the first number of layers and the second number of layers, and in which the first electrode and the second electrode are configured to form a plasma in response to the voltage, each of the number of plasma actuators having a lower number of electrodes than number of layers in the plurality of layers; and
    modifying the airflow over the surface in response to changing the plasma.

2. The method of claim 1, wherein the surface is on an aircraft and further comprising:
    changing movement of the air in response to modifying the airflow over the surface.

3. The method of claim 1, wherein the step of changing the plasma formed by the number of plasma actuators further comprises:
    changing the plasma formed by the number of plasma actuators in response to an input received from an operator input device.

4. The method of claim 1, wherein interspersing the first number of layers with the second number of layers provides each of the number of plasma actuators with a desired flexibility that is configured to conform to a curved surface.

5. The method of claim 1, wherein the first number of layers is interspersed with the second number of layers by alternating between a layer of the flexible material in the first number of layers and a layer of the dielectric material in the second number of layers.

6. The method of claim 5, wherein the flexible material of the first number of layers is selected from one of fluorinated ethylene propylene, polytetrafluoroethylene, nylon, a fluorocarbon, a polyamide, a polyester, a polyethylene, a silicone tape, a thermoplastic flexible material, and a polyurethane; and wherein the dielectric material of the second number of layers is selected from one of a polyimide film and 4,4'-oxydiphenylene-pyromellitimide.

7. The method of claim 6, wherein the flexible material is fluorinated ethylene propylene, and wherein the dielectric material is 4,4'-oxydiphenylene-pyromellitimide.

* * * * *